(12) United States Patent
Stenfort

(10) Patent No.: US 6,662,334 B1
(45) Date of Patent: Dec. 9, 2003

(54) METHOD AND DEVICE FOR PERFORMING ERROR CORRECTION ON ECC DATA SECTORS

(75) Inventor: Ross J. Stenfort, Los Altos, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/258,246

(22) Filed: Feb. 25, 1999

(51) Int. Cl.$^7$ .............................................. G11B 20/18
(52) U.S. Cl. ..................................................... 714/769
(58) Field of Search .............................. 714/769, 784, 714/785

(56) References Cited

U.S. PATENT DOCUMENTS

| | | | | |
|---|---|---|---|---|
| 4,413,339 A | * | 11/1983 | Riggle et al. | 714/765 |
| 4,562,577 A | * | 12/1985 | Glover et al. | 369/44.34 |
| 4,567,594 A | * | 1/1986 | Deodhar | 714/759 |
| 4,763,332 A | * | 8/1988 | Glover | 714/756 |
| 4,849,975 A | * | 7/1989 | Patel | 714/761 |
| 4,928,280 A | * | 5/1990 | Nielson et al. | 714/756 |
| 5,107,503 A | * | 4/1992 | Riggle et al. | 714/784 |
| 5,537,421 A | * | 7/1996 | Dujari et al. | 714/761 |
| 5,631,914 A | * | 5/1997 | Kashida et al. | 714/755 |
| 5,701,314 A | | 12/1997 | Armstrong et al. | 371/40.3 |
| 5,715,262 A | * | 2/1998 | Gupta | 371/37.1 |
| 5,719,884 A | | 2/1998 | Roth et al. | 371/37.4 |
| 5,805,617 A | | 9/1998 | Im | 371/37.12 |
| 5,991,911 A | * | 11/1999 | Zook | 714/758 |
| 6,032,283 A | * | 2/2000 | Meyer | 714/746 |
| 6,041,368 A | * | 3/2000 | Nakatsuji et al. | 710/20 |
| 6,115,837 A | * | 9/2000 | Nguyen et al. | 714/756 |
| 6,158,040 A | * | 12/2000 | Ho | 714/770 |
| 6,163,871 A | * | 12/2000 | Yang | 714/769 |
| 6,192,499 B1 | * | 2/2001 | Yang | 714/785 |
| 6,363,511 B1 | * | 3/2002 | Massoudi | 714/755 |

OTHER PUBLICATIONS

S. Lin and D. Costello, Jr., "Error Control Coding", Published 10–82, © 1983, Prentice–Hall, Inc. Englewood Cliffs, NJ, pp. 167–174.
Unknown, "Chapter 1, Introduction".
S. Wilson, "Digital Modulation and Coding", 1996, Ch. 5, pp. 470–472, Prentice–Hall, NJ.
N. Glover and T. Dudley, "Practical Error Correction Design for Engineers", 1991, Cirrus Logic, Inc., CO, Rev. $2^{nd}$ Ed.
W. W. Peterson and E.J. Weldon, Jr., "Error–Correcting Codes", 1972, ($12^{th}$ printing 1994), Mass, Inst. Of Technology, pp. 131–136.
S. Wicker, "Error Control Systems for Digital Communication and Storage", 1995 Prentice–Hall, NJ, CH 9, pp. 203–234.

* cited by examiner

Primary Examiner—Stephen M. Baker
(74) Attorney, Agent, or Firm—Martine & Penilla LLP

(57) ABSTRACT

Methods and device are provided for detecting and correcting errors in error correction coded (ECC) data sectors. The ECC data sectors are sequentially received as a data stream from a data storage medium. The device includes a buffer and an error detection and correction (EDAC) circuitry. The buffer is arranged to sequentially receive and store the ECC data sectors from the data storage medium. The EDAC circuitry is arranged to sequentially receive the ECC data sectors for sequentially generating a plurality of syndrome sets for the ECC data sectors with one syndrome set per ECC data sector. Each syndrome set includes a plurality of syndromes. The EDAC circuitry sequentially stores the syndrome sets into the buffer while accessing the stored syndrome sets sequentially to decode errors in the associated ECC data sectors. Preferably, erasure information containing one or more bad data byte locations is also generated and stored along with the syndromes for each ECC data sector. Then, the stored erasure information is accessed along with the syndromes for decoding errors in the ECC data sectors.

29 Claims, 7 Drawing Sheets

METHOD AND DEVICE FOR PERFORMING ERROR CORRECTION ON ECC DATA SECTORS

BACKGROUND OF THE INVENTION

1. Field of the Invention

This invention relates generally to computer storage devices, and more particularly to devices for detecting and correcting errors in data that are read in from storage device media.

2. Description of the Related Art

Modem computer systems typically include one or more storage devices (e.g., hard disk drives, CD-ROM drives, DVD-ROM drives, etc.) to store large amount of data and programs. These mass storage devices can provide information to the processors in the computer systems through random access memory (RAM) circuitry such as dynamic random access memory (DRAM), static random access memory (SRAM), etc. For most computer systems, storing information in a mass storage device and retrieving the information as needed in a hierarchical structure is generally far more economical than using exclusively a RAM circuitry. As used herein, the term "storage device" refers to any suitable mass storage devices that store and access data to and from a circular disk such as hard disk drives, CD-ROM and CD-RAM drives, DVD-ROM and DVD-RAM drives, removable disk drives, and the like.

Mass storage devices typically store information in sectors by using magnetic or optical technology. Like most recording technology, reading data bits from the sectors often generates errors due to noise, manufacturing imperfections of the physical medium, dust, etc. To detect and correct such errors, mass storage devices typically implement an error correction code (ECC) scheme in writing to and reading from hard disk drives. The implementation of ECC schemes allows encoding of user data for reliable recovery of the original data.

Conventional ECC schemes often implement well known Reed-Solomon codes for detecting and correcting errors in data that have been read in from the devices. The Reed-Solomon codes are defined by a generator polynomial, which has 2t consecutive powers of $\alpha$ as roots, where a is a primitive element in an extension field $GF(2^m)$. In this case, each codeword polynomial $c(x)$ will have the same sequence of roots, or $c(\alpha^i)=0$, where $i=1, 2, 3, \ldots, 2t-1$. Thus, the codeword polynomial $c(x)$ may be evaluated at each power of a to yield a set of simultaneous equations.

In this scenario, a single received word represented as a polynomial $r(x)$ can be evaluated as the sum of the transmitted codeword polynomial $c(x)$ and the error polynomial $e(x)$: $r(x)=c(x)+e(x)$. Then, the polynomial $r(x)$ can be evaluated for each of the roots $\alpha, \alpha^2, \alpha^3, \ldots, \alpha^{2t-1}$ to yield $r(\alpha^k)=c(\alpha^k)+e(\alpha^k)$, where $k=1, 2, \ldots, 2t-1$. Since $c(\alpha k)$ is equal to zero for $k=1, 3, \ldots, 2t-1$, the equation is simplified to: $r(\alpha^k)=e(\alpha^k)$. The values produced by this equation are called syndrome values and are typically denoted as $s_k=r(\alpha^k)=e(\alpha^k)$, which is equivalent to the following: $e_0(\alpha^k)^0 + e_1(\alpha^k)^1 + e_2(\alpha^k)^2 + \ldots + e_{n-1}(\alpha^k)^{n-1}$.

Since the coefficient ei will either be 0 or 1, the syndrome value may be expressed as a sum of the terms having nonzero coefficients only. By reversing the order of exponents, the syndrome value can be derived in accordance with the following equation:

$$S_k = \sum_{e_i \neq 0} (\alpha^j)^k, \quad k = 1, 3, \ldots, 2t-1 \quad (1)$$

Equation (1) thus defines a system of equations that can be solved for the nonzero coefficients $e_i$ based on the syndrome values $s_k$. The Reed-Solomon codes for encoding and decoding error correction codes are well known in the art and are described in more detail in in Error Coding Cookbook (1996), by C. Britton Rorabaugh, ISBN 0-07-911720-1, and in Error Control Systems for Digital Communication and Storage by Stephen B. Wicker, ISBN 0-13-200809-2. These references are incorporated herein by reference.

In order to utilize the ECC scheme, data is first encoded into an ECC format for storage. For example, a conventional ECC scheme typically computes ECC checkbytes for a given block of user data such as a sector. Then, the computed ECC checkbytes are appended to the sector of user data to form ECC data sector and then recorded on a storage device medium. Thus, each ECC data sector typically contains user data (e.g., 512 bytes) and additional ECC check bytes appended to the user data bytes.

A Each of the ECC data sectors also includes a sync pattern or bytes for identifying the beginning of the sector. The sync pattern or bytes are thus used to delineate a sector boundary. When the recorded sectors of data are read from a storage device medium, the ECC scheme decodes the received sector data including the ECC bytes by generating syndromes for the received data in each of the sectors. Zero syndromes indicate that no error has been detected in the sector while non-zero syndromes indicate that one or more errors have been detected in the sector. For each of the sectors with non-zero syndromes, error locations and error patterns are determined and based on the error locations and patterns, the detected errors in the sector are corrected.

Hard disk drives implementing the ECC schemes are well known in the art and is described, for example, the following references: U.S. Pat. No. 6,192,499, by Honda Yang and entitled "Device and Method for Extending Error Correction Beyond One Sector Time" and U.S. Pat. No. 6,092,233, by Honda Yang and entitled "Pipelined Berlekamp-Massey Error Locator Polynomial Generating Apparatus and Method." In addition, optical disk drives (e.g., CD-ROM, CD-RAM, DVD-ROM, DVD-RAM, etc.) implementing the ECC schemes are also well known in the art and are described, for example, in U.S. Pat. No. 6,457,156, by Ross J. Stenfort and entitled "Error Correction Method and Apparatus." These references are incorporated herein by reference.

As the storage device density increases to store more data on a given storage medium, however, more errors will need to be detected and corrected when reading data off the medium. In addition, modern storage devices typically gain performance advantages by reading the data off the medium at a higher data rate. In both instances, more data are read and processed for a given time or more time is required to process the same amount of data. Even in the absence of these factors, it is often desirable to implement a higher correction power in the ECC schemes by increasing the number of errors detected and corrected.

Unfortunately, detecting and correcting more errors require more time to decode errors in ECC data sectors by determining error locations and patterns. For example, in order to detect more errors, more syndromes need to be generated for a given ECC data sector. The generation of more syndromes, in turn, requires more computing resources and/or time to determine the error locations and patterns.

Furthermore, modem ECC decoders typically strive to process error on-the-fly by computing the error patterns and locations for a received ECC data sector within the time to receive the next ECC data sector. In such a circumstance, the time to compute the error locations and patterns is further diminished. As a result, the ECC decoder may not be able to decode the errors for the received ECC data sector within the time to receive the next ECC data sector. In this case, an error event often called "correction overrun" is generated to suspend reading of the next ECC data sector from a storage medium until the ECC decoder generates the error locations and patterns. Then, the reading of the next ECC data sector resumes by waiting for the storage medium to make another revolution to the beginning of the interrupted sector. Such interruption of data flow thus causes undesirable delays and performance penalties.

One solution implements a very fast ECC decoder to ensure that the worst case buffer access latency is within the allotted time to receive the next ECC sector data. This approach, however, would require complex and expensive hardware resources for implementing the ECC decoder. For the most part, the typical time needed to correct the errors in an ECC data sector is substantially less than the time to read in the next sector. Hence, using such an expensive ECC decoder may not be economically feasible in practice. On the other end of the spectrum, using a slow but relatively inexpensive ECC decoder may lead to frequent crashing of applications when a substantial number of errors are present.

Another approach stores all the data and ECC checkbytes in a buffer as is done in optical drives such as CD-ROM drives. However, ECC checkbytes may use up a large percentage of the buffer so that the data may not be adequately cached. Furthermore, the ECC checkbytes and the sector data for each sector may not be stored in a concurrent manner, thereby requiring additional methods to make the data and ECC checkbytes concurrent. In addition, under this approach, an ECC decoder is forced to fetch both data and ECC checkbytes from the buffer to compute the syndromes for error correction. The data fetch to compute the syndromes often takes up significant amount of bandwidth.

Thus, what is needed is a cost effective device and method that can detect and correct errors on ECC data sectors on-the-fly without interrupting data flow. What is further needed is an extended error correction device and method that can be implemented without integrating costly hardware resources.

SUMMARY OF THE INVENTION

Broadly speaking, the present invention fills these needs by providing method and device for extending error correction beyond one sector time. It should be appreciated that the present invention can be implemented in numerous ways, including as a process, an apparatus, a system, a device, a method, or a computer readable medium. Several inventive embodiments of the present invention are described below.

In one aspect of the invention, the present invention provides a method for detecting and correcting errors in error correction coded (ECC) data sectors. The ECC data sectors are sequentially received from a data storage medium. The method includes the operations of: (a) receiving a current ECC data sector, where the current ECC data sector is an ECC data sector currently being received; (b) while receiving the current ECC data sector, detecting errors in the current ECC data sector by generating a set of syndromes; (c) storing the set of syndromes for the current ECC data sector when the current ECC data sector has been received; (d) repeating the operations (a) through (c) for a next ECC data sector, wherein the current ECC data sector becomes a past sector and the next ECC data sector becomes the current ECC data sector; and (e) while repeating the operations (a) through (c) for the current sector, decoding the errors for the past ECC data sector by accessing the set of syndromes for the past ECC data sector. In a preferred embodiment, erasure information containing one or more bad data byte locations is also generated and stored along with the syndromes for each ECC data sector. Then, the stored erasure information is accessed along with the syndromes for decoding errors in the ECC data sectors.

In another aspect of the invention, the present invention provides a device for detecting and correcting errors in error correction coded (ECC) data sectors. The ECC data sectors are sequentially received as a data stream from a data storage medium. The device includes a buffer and an error detection and correction (EDAC) circuitry. The buffer is arranged to sequentially receive and store the ECC data sectors from the data storage medium. The EDAC circuitry is arranged to sequentially receive the ECC data sectors for sequentially generating a plurality of syndrome sets for the ECC data sectors with one syndrome set per ECC data sector. Each syndrome set includes a plurality of syndromes. The EDAC circuitry sequentially stores the syndrome sets into the buffer while accessing the stored syndrome sets sequentially to decode errors in the associated ECC data sectors. In one embodiment, the device generates erasure information, which is stored along with the syndromes for each ECC data sector. The EDAC circuitry accessed the stored erasure information and the syndromes for decoding errors in the ECC data sectors.

In yet another aspect of the invention, the present invention provides a method for detecting and correcting errors in error correction coded (ECC) data sectors. The ECC data sectors are sequentially received as a data stream from a data storage medium. The ECC data sectors are sequentially received and stored from the data storage medium. While receiving the ECC data sectors, a plurality of syndrome sets is sequentially generated for the ECC data sectors with one syndrome set per ECC data sector. Each syndrome set includes a plurality of syndromes. The generated syndromes sets are sequentially stored. Then, the stored syndrome sets are accessed to decode errors in the associated ECC data sectors. In one embodiment, erasure information is also generated and stored in the buffer along with the syndromes for each ECC data sector. The stored erasure information is then accessed along with the syndromes for sequentially decoding errors in the ECC data sectors.

The present invention thus generates syndromes as the ECC data sectors are received and stores the generated syndromes in a buffer. The stored syndromes can then be fetched from the buffer for performing error correction. The buffer is updated with a new set of syndromes for a new ECC data sector after the new sector has been received. By thus storing the generated syndromes for each of the sectors, the present invention effectively decouples decoding of errors from the one sector time limitation without substantially affecting buffer performance and without the increased cost associated with a faster EDAC circuitry.

Specifically, decoding of errors need not occur within the time to receive the next ECC data sector since the syndromes are stored and accessed for on-the-fly error correction. For optical disk drives, in particular, buffer performance is not degraded since data need not be fetched to compute syndromes. Furthermore, by using the buffer in a circular buffer configuration to overwrite previously accessed syndromes, the buffer space for storing the syndromes can be kept to a minimum. Accordingly, the present invention provides significant savings in cost while providing a performance boost at the same time.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and device for performing error correction on ECC data sectors. It will be obvious, however, to one skilled in the art, that the present invention may be practiced without some or all of these specific details. In other instances, well known process operations have not been described in detail in order not to unnecessarily obscure the present invention.

Figure 1:
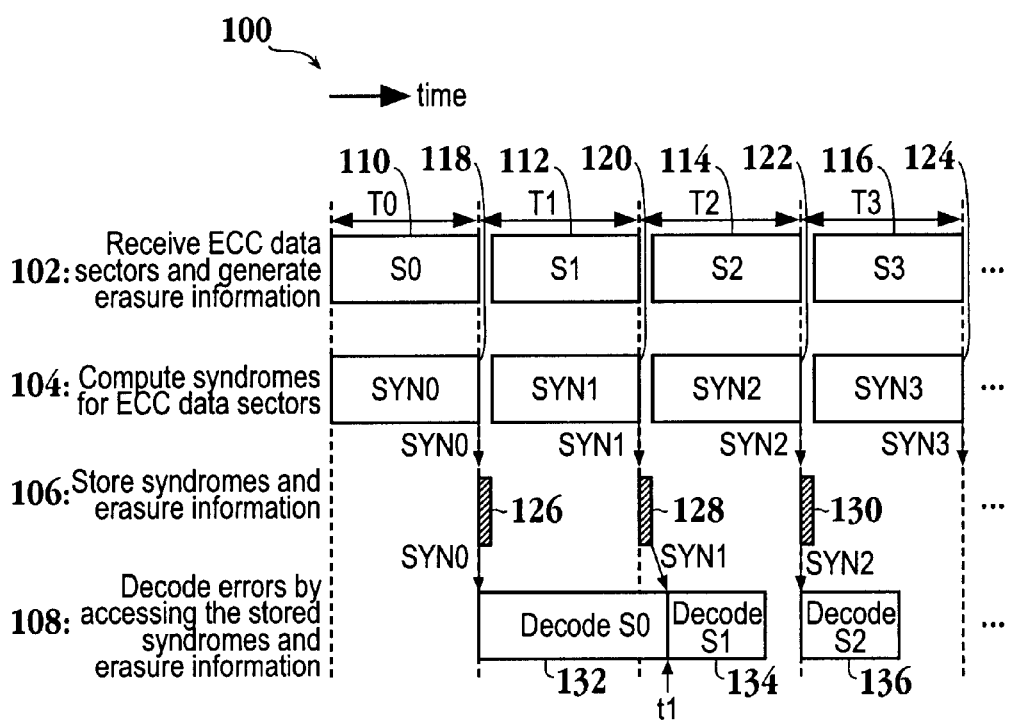
FIG. 1 illustrates an exemplary error correction pipeline as a function of time in accordance with one embodiment of the present invention.

FIG. 1 illustrates an exemplary error correction pipeline 100 as a function of time in accordance with one embodiment of the present invention. The error correction pipeline includes four pipelined operations as represented by rows 102, 104, 106, and 108. The first row 102 shows time blocks 110, 112, 114, and 116 corresponding to receiving a sequence of ECC data sectors S0, S1, S2, S3, respectively, and generating erasure information for each data sector. The second row 104 shows time blocks 118, 120, 122, and 124, which correspond to generating syndrome sets SYN0, SYN1, SYN2, and SYN3 for the sectors S0, S1, S2, and S3, respectively. Sector times T0, T1, T2, and T3 represent the time duration to receive the sectors S0, S1, S2, and S3, respectively, and the time for generating the sets of syndromes SYN0, SYN1, SYN2, and SYN3, respectively. The third row 106 shows time blocks 126, 128, and 130 associated with storing the generated syndrome sets SYN0, SYN1, SYN2, respectively, and the erasure information upon completion of receiving the respective data sectors.

The fourth row 108 of the error correction pipeline 100 illustrates time blocks 132, 134, and 136, which are associated with decoding errors in ECC data sectors S0, S1, and S2, respectively, by accessing the stored syndrome sets SYN0, SYN1, and SYN2, respectively, and the associated erasure information.

In this pipelined configuration, ECC data sector S0 is received and the syndromes for S0 are generated during sector time T0. At the end of time T0 when the entire sector S0 has been received, the final set of syndromes SYN0 for the sector S0 is generated and stored into a buffer. During the next sector time T1, a new ECC data sector S1 is received sequentially and its syndromes are generated. At the same time, the stored set of syndromes SYN0 is accessed and errors in sector S0 are decoded.

In this illustrated embodiment, the sector SO contains numerous errors, thereby requiring additional time beyond the time duration T1 to receive the sector T1. Accordingly, the error decoding operation for sector SO extends beyond sector time T1 and into sector time T2. However, the extension of error correction into sector time T2 for sector S0 does not adversely affect the pipelined operation in FIG. 1. This is because the next set of syndromes SYN1 for sector S1 is stored at the end of sector time T1. Thus, error-decoding operation of row 108 is effectively decoupled from the conventional limitation of decoding errors within the time to receive the next sector. When error correction is completed for S0 at time t1 in sector time T2, the stored set of syndromes SYN1 is accessed for decoding errors in the associated sector S1.

During sector time T2, the ECC data sector S2 is received and associated set of syndromes SYN2 is generated. When errors have been decoded for sector S0, the set of syndromes SYN1 for sector S1 is accessed and decoded within sector time T2. At the end of sector time T2, the generated set of syndromes SYN2 is stored. At the beginning of the next sector time T3, the stored set of syndromes SYN2 for sector 2 is accessed for error correction. Throughout sector time T3, the set of syndromes SYN3 for sector S3 is generated while the ECC data sector S3 is being received. In this manner, this pipelined error detection and correction process may continue for the following ECC data sectors.

In a preferred embodiment, the present invention also employs erasure information in performing error detection and correction. As is well known in the art, erasures are used to indicate the location of potentially bad (e.g., corrupt) data. As such, erasure information may include a starting address and a length of the bad data bytes. The starting address indicates the starting address of the bad data bytes in a sector while the length (e.g., offset) denotes the length of the bad data bytes from the starting address.

With continuing reference to FIG. 1, erasure information may be generated for each ECC data sector as the ECC data sectors are received. Then, for each ECC data sector, the generated erasure information is stored in the buffer along with the associated set of syndromes. When a set of syndromes is accessed from the buffer, the erasure information is also accessed and used in decoding and/or correcting errors in the associated ECC data sector.

Figure 2:
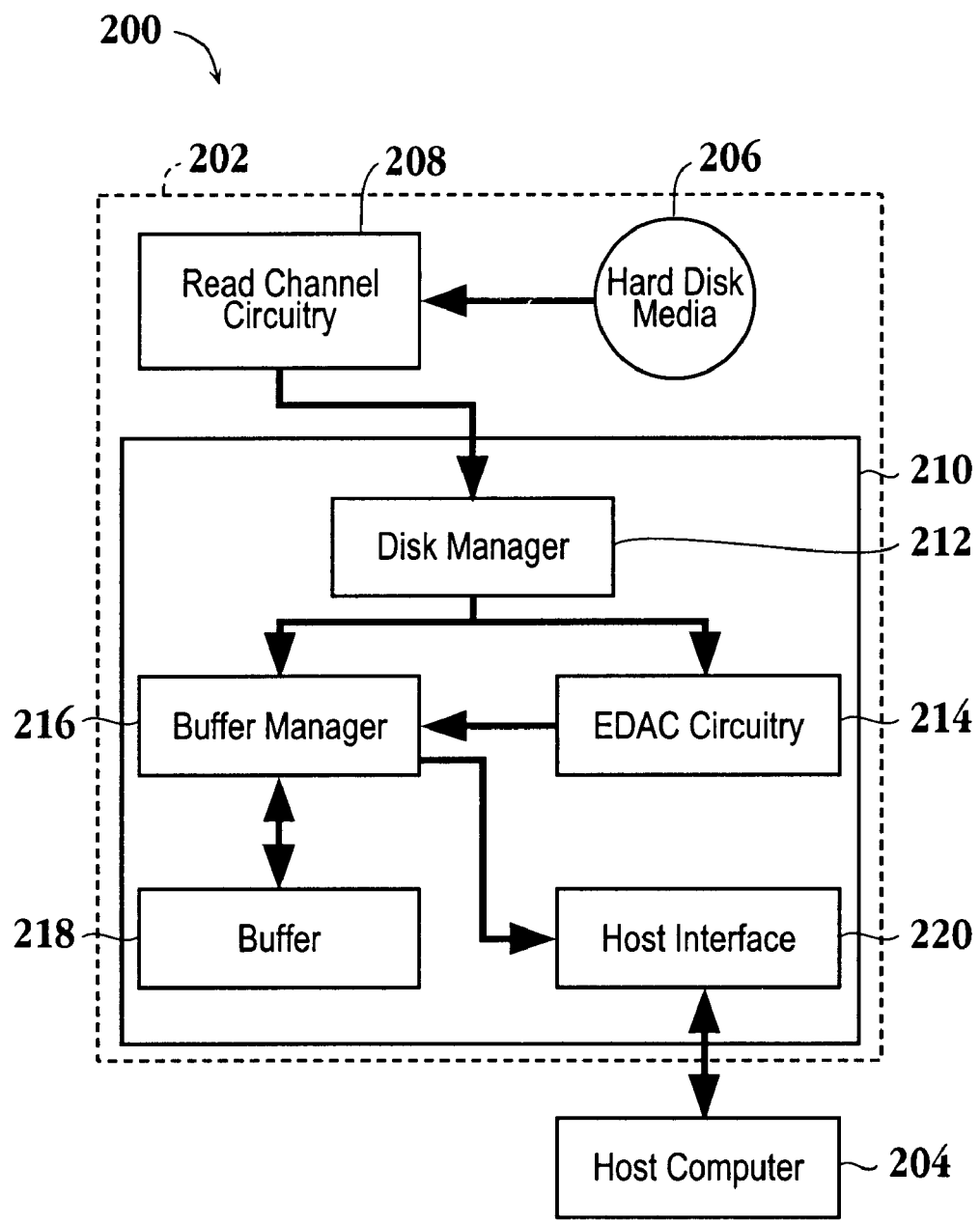
FIG. 2 illustrates an exemplary computer system including a host computer and a hard disk drive in accordance with one embodiment of the present invention.

FIG. 2 illustrates an exemplary computer system 200 including a host computer 204 and a hard disk drive 202 in accordance with one embodiment of the present invention. The host computer 204 is coupled to the hard disk drive 202 to receive user or ECC decoded data. The hard disk drive 202 includes hard disk media 206, a read channel circuitry 208, and a hard disk controller (HDC) 210. The read channel circuitry 208 receives ECC encoded data sectors (e.g., S0, S1, S2, S3, etc.) sequentially as a data stream from the hard disk media 206 and converts the sector data from analog into digital data format.

The hard disk controller 210 sequentially receives the ECC data sectors from the read channel circuitry 208 for performing error detection and correction. The hard disk controller 210 includes a disk manager 212, an error detection and correction (EDAC) circuitry 214, a buffer manager 216, a buffer 218, and a host interface 220. In this configuration, the disk manager 212 sequentially receives the stream of ECC data sectors and identifies each of the sectors (e.g., S0, S1, S2, S3, etc.) by detecting a sync pattern or sync bytes at the beginning of each of the sectors. The disk manager 212 transmits the data bytes of the sectors to the EDAC circuitry 214 and the buffer manager 216 concurrently and in parallel. The buffer manager 216, in turn, transmits the received sector data into the buffer 218 for storage. The buffer manager 216 provides interface functions for accessing the buffer 218.

The disk manager 212 may also generate control signals for error detection and correction. For example, upon identifying a sector, the disk manager 212 may generate a SYNC signal, which indicates the detection of a new sector, for synchronizing sector data processing. The SYNC signal may then be provided to the EDAC circuitry 214 and the buffer manager 216 for synchronizing error detection and correction.

The EDAC circuitry 214 is coupled to the disk manager 212 to sequentially receive the bytes of the identified sequence of sectors on-the-fly. When all the bytes of a current sector have been received, the EDAC circuitry 214 generates a set of syndromes (e.g., SYN0) for the received sector (e.g., S0). The generated syndromes indicate whether an error is present in the current sector. For example, a zero syndrome indicates that no error has been detected. On the other hand, a non-zero syndrome indicates that one or more errors have been detected in the received data.

The EDAC circuitry 214 transmits the generated syndromes to the buffer 218 via the buffer manager 216 for storage. The storage of the syndromes for sectors effectively decouples the EDAC circuitry 214 from having to perform error correction on a sector within the time to receive the next sector. The buffer 218 receives and stores the sector data and the sector syndromes for error correction. The EDAC circuitry 214 sequentially accesses the sector syndromes stored in the buffer 218 to decode errors in the sectors. In this manner, the operations of receiving data sectors and generating syndromes are effectively decoupled from the operation of decoding errors.

From the accessed set of syndromes for a sector, the EDAC circuitry 214 decodes errors and performs error correction, if necessary. For example, the EDAC circuitry 214 generates error locations and error patterns for the sector associated with the accessed set of syndromes. The EDAC circuitry 214 then performs error correction on the sector based on the generated error locations and error patterns. When data sectors have thus been processed, the corrected sector data (i.e., ECC decoded data) are provided to the host interface 220, which provides the corrected sector data to the host computer 210 as user data. The host interface 220 provides interface functions between the hard disk controller 210 and the host computer 204.

Figure 3:
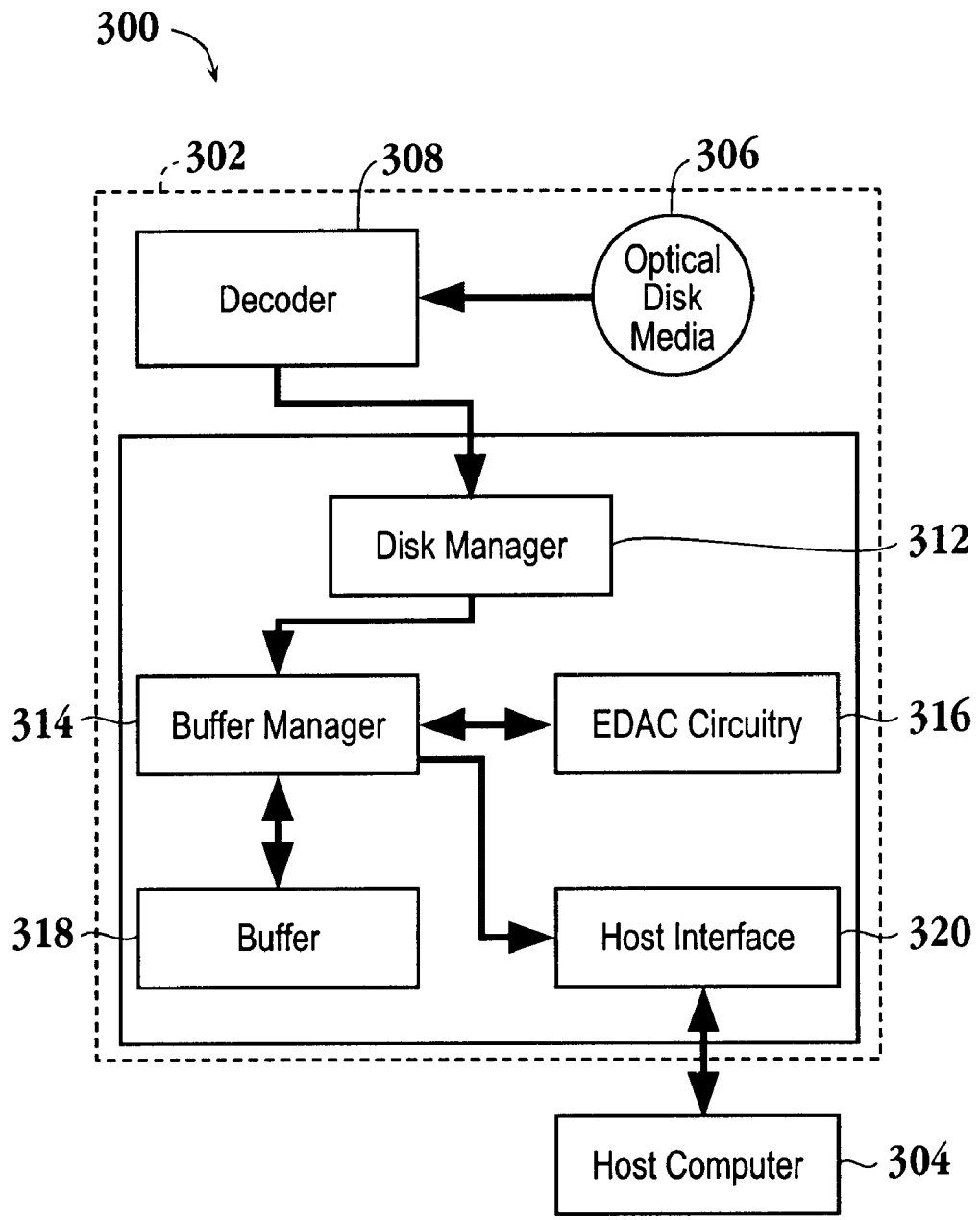
FIG. 3 illustrates an exemplary computer system including a host computer and an optical disk drive in accordance with one embodiment of the present invention.

The present invention may also be implemented in other storage devices such as optical disk drives. For example, FIG. 3 illustrates an exemplary computer system 300 including a host computer 304 and an optical disk drive 302 (e.g., CD-ROM drive, DVD-ROM drive, etc.) in accordance with one embodiment of the present invention. The host computer 304 is coupled to the optical disk drive 302 to receive user or ECC decoded data. The optical disk drive 302 includes optical disk media 306, a decoder 308, and a disk controller 310. The decoder 208 receives an ECC encoded data stream from the optical disk media 206 and arranges the data stream into identifiable data units such as data sectors or blocks. As is well known in the art, the decoder 208 arranges the data stream into ECC encoded ECC data sectors for CD-based drives and into ECC data blocks for DVD-based drives. In the case of DVD-based drives, the ECC blocks comprise an array that includes a plurality of rows and columns of data and ECC checkbytes. As used herein, the term "sector" refers to any identifiable unit of data and includes both the sector and block within its meaning.

The disk controller 310 sequentially receives the ECC data sectors from the decoder 308 for performing error detection and correction. The hard disk controller 310 includes a disk manager 312, a buffer manager 314, an error detection and correction (EDAC) circuitry 316, a buffer 318, and a host interface 320. In this arrangement, the disk manager 312 sequentially receives the stream of ECC data sectors and identifies each of the sectors (e.g., S0, S1, S2, S3, etc.) by detecting a sync pattern or sync bytes at the beginning of each of the sectors.

The disk manager 312 sequentially transmits the sector data to the buffer manager 314 on-the-fly. The buffer manager 314 is arranged to provide interface functions for accessing the buffer 318 and transmits the received sector data to the buffer 318 for storage. At the same time, the buffer manager 314 also transmits the received sector data to the EDAC circuitry 316 on-the-fly for generating syndromes.

The EDAC circuitry 316 is coupled to the buffer manager 314 to sequentially receive the bytes of the identified sequence of sectors for generating syndromes for the received sector. When all the bytes of the sector have been received, the EDAC circuitry 316 generates a set of syndromes for the received sector. The EDAC circuitry 316 transmits the generated syndromes to the buffer 318 via the buffer manager 314 for storage. Similar to the hard disk drive 202 of FIG. 2, the storage of the syndromes for sectors effectively decouples the EDAC circuitry 316 from having to perform error correction on a sector within the time to receive the next sector. Furthermore, in contrast to conventional techniques where sector data is fetched back into the EDAC circuitry 316 for computing syndromes, the present embodiment dispenses with such fetching of data since the syndromes are stored on-the-fly.

From the accessed set of syndromes for a sector, the EDAC circuitry 316 decodes errors and performs error correction, if necessary. For example, the EDAC circuitry 316 generates error locations and error patterns for the sector associated with the accessed set of syndromes. The EDAC circuitry 316 then performs error correction on the sector based on the generated error locations and error patterns. When data sectors have thus been processed, the corrected sector data are provided to the host interface 320, which provides the corrected sector data to the host computer 310 as user data. The host interface 320 provides interface functions between the hard disk controller 310 and the host computer 304.

Figure 4:
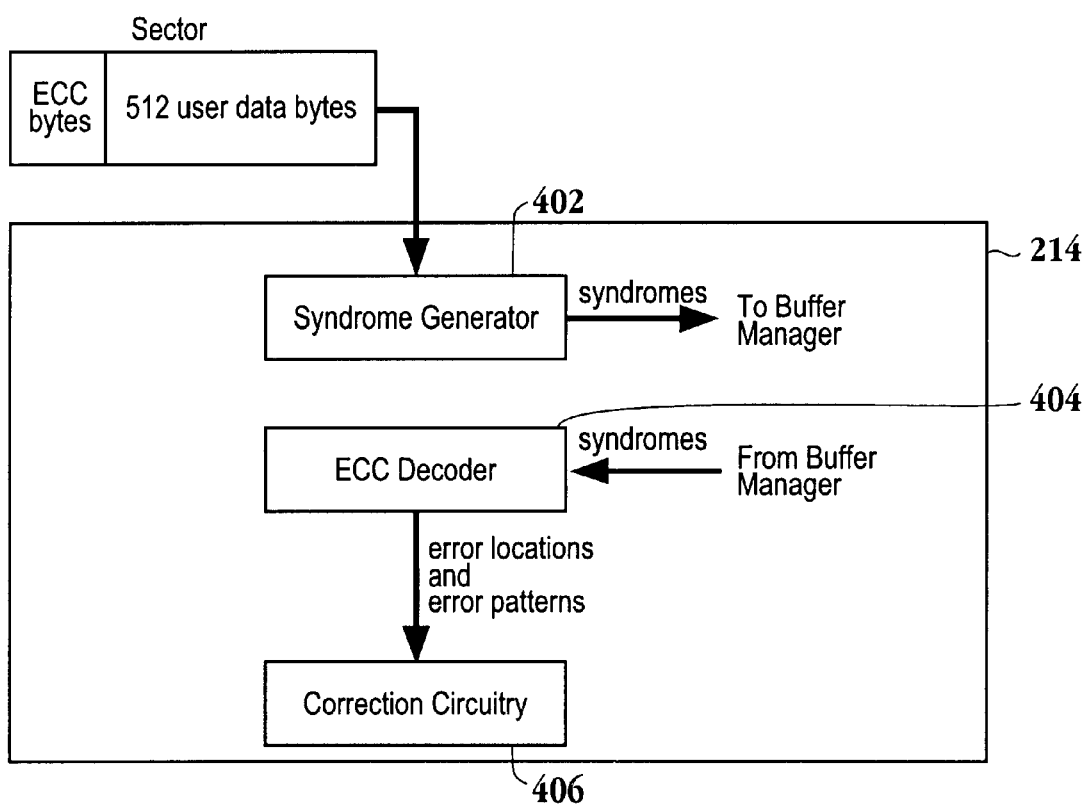
FIG. 4 illustrates a more detailed block diagram of an EDAC circuitry in accordance with one embodiment of the present invention.

FIG. 4 illustrates a more detailed block diagram of the EDAC circuitry 214 in accordance with one embodiment of the present invention. Although the illustrated embodiment shows the EDAC circuitry 214 for hard disk controller, those skilled in the art will appreciate that the EDAC circuitry 316 may also be implemented in a similar as the EDAC circuitry 214. The EDAC circuitry 214 contains a syndrome generator 402, an ECC decoder 404, and a correction circuitry 406. The syndrome generator 402 is arranged to receive ECC data sectors sequentially on-the-fly. As each of the bytes of an identified sector 408 is received sequentially, the syndrome generator 402 generates interim syndromes for all the bytes of the sector received up to that point in time. When all the bytes of the identified sector have been received, the syndrome generator 402 generates a final set of interim syndromes for the entire sector 408. Syndrome generators are well known in the art and typically include linear feedback shift registers. For example, exemplary syndrome generators are described in U.S. Pat. No. 6,163,871, entitled "RAM Based Error Correction Code Encoder and Syndrome Generator with Programmable Interleaving Degrees," by Honda Yang and is incorporated herein by reference.

As soon as the set of syndromes has been generated for the sector 408, the EDAC circuitry 214 transmits the generated set of syndromes to the buffer manager 216 for storage in the buffer 218. At the same time, the syndrome generator receives a next sector to generate a new set of syndromes on-the-fly. In this manner, the syndrome generation proceeds continuously without being tied to error decoding in the ECC decoder 404.

The ECC decoder 404 is arranged to sequentially receive the stored sets of syndromes from the buffer 218 via the buffer manager 216. That is, the buffer manager 216 accesses the buffer 218 and sequentially transmits the sets of syndromes stored in the buffer 218, one set of syndrome at a time. For each set of syndromes received, the ECC decoder 404 computes error locations and error patterns for the sector associated with the received set of syndromes. ECC decoders are well known in the art and are described in the incorporated references listed above.

Upon generating the error locations and error patterns from the received set of syndromes, the ECC decoder transmits the error locations and patterns to the correction circuitry 406. The correction circuitry 406 is coupled to the ECC decoder 404 and performs error correction on the sector associated with the received set of syndromes. That is, the correction circuitry 406 accesses the sector data stored in the buffer 218 and corrects errors in the sector based on the computed error locations and patterns. In an alternative embodiment, the correction circuitry 406 may be located outside of the EDAC circuitry 214 for accessing and correcting errors on the sectors. For example, the buffer manager 216 may include the correction circuitry 406 for receiving the error locations and patterns, and then performing error correction on the associated sector. Correction circuitry are well known in the art and typically includes one or more exclusive OR gates for correcting errors.

Figure 5:
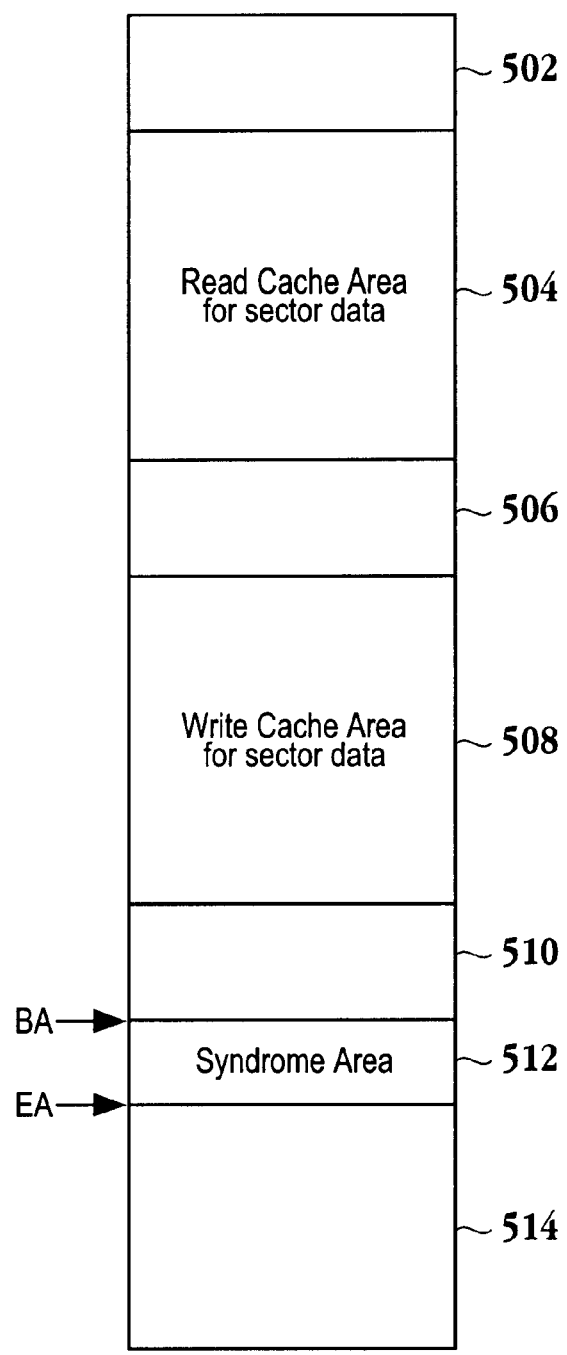
FIG. 5 illustrates a more detailed block diagram of a buffer for storing sector data and syndromes in accordance with one embodiment of the present invention.

FIG. 5 illustrates a more detailed block diagram of the buffer 218 for storing sector data and syndromes. The buffer 218 is arranged into a plurality of areas 502, 504, 506, 508, 510, 512, 514 to hold a plurality of data types. The buffer may be implemented by using any suitable random access memory technology such as DRAM, SDRAM, SRAM, and the like. Each area is configured to hold data of similar data types. For example, the buffer area 504 is a read cache area for storing sector data when sectors are read in from a storage medium. On the other hand, the buffer area 508 is a write cache area for storing sectors that are to be written to a storage medium.

The area 512 is a syndrome area arranged to store the sets of syndromes upon generation in the syndrome generator. The buffer area 512 is identified by a beginning address (BA) and an ending address (EA). Other areas 502, 506, 510, and 514 may be used to hold other miscellaneous data or to allow the sizes of the areas 504, 508, and 512 to vary dynamically during sector data processing. In one embodiment, the syndrome area may be used to hold erasure information as well. Alternatively, one of the miscellaneous areas 502, 506, 510, or 514 may be used to store the erasure information. Even though the buffer 218 for a hard disk drive is illustrated in FIG. 5, those skilled in the art will recognize that the buffer 318 for an optical disk drive may be implemented in a similar manner.

Figure 6:
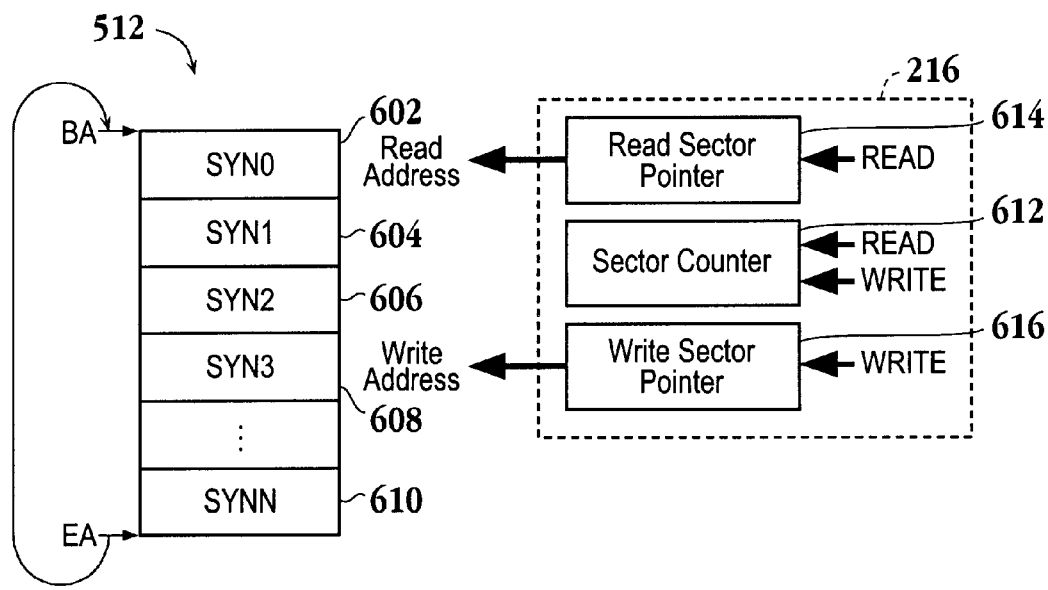
FIG. 6 shows a more detailed diagram of a syndrome area in the buffer and a buffer manager to support access of the syndrome area in accordance with one embodiment of the present invention.

FIG. 6 shows a more detailed diagram of the syndrome area 512 in the buffer 218 and the buffer manager 314 to support access of the syndrome area 512 in accordance with one embodiment of the present invention. In this embodiment, the syndrome area 512 is in a circular buffer arrangement to minimize space requirements for storing the sector syndromes. Specifically, the syndrome area 512 is arranged as a plurality of regions 602, 604, 606, 608, and 610 for holding syndrome sets SYN0, SYN1, SYN2, SYN3, and SYNN, respectively. The BA and EA signify the beginning and ending address of the syndrome area 512 in the buffer 218. The syndrome area 512 may hold up to N syndrome sets.

The buffer manager 314 includes a sector counter 612, a read sector pointer 614, and a write sector pointer 616. The sector counter 612 keeps track of the number of usable syndrome sets in the syndrome area in response to a WRITE or a READ signal. For example, when a WRITE signal is asserted to write (i.e., store) a set of syndromes (e.g., SYN0) into the syndrome area 512, the sector counter is incremented by 1 to reflect the addition of a new syndrome set into the buffer 512. On the other hand, when a READ signal is asserted to read a set of syndromes (e.g., SYN0) from the syndrome are 512, the sector counter is decremented by 1 to reflect the deletion of the accessed set of syndromes. The sector counter may thus keep track of the number of syndrome sets in the syndrome area up to the maximum of N syndrome sets. In a preferred embodiment, the maximum number of syndrome sets that can be stored in a buffer is four.

The read and write sector pointers initially point to BA of the syndrome region 512. The read sector pointer 614 sequentially keeps track of the set of syndromes to be read next. Specifically, the read sector pointer 614 points to the region where the next set of syndromes is to be read from. As a set of syndromes are read from the buffer in response to the READ signal, the read sector pointer 614 increments to point to the next syndrome region in sequence. For example, when the syndrome set SYN0 for sector 0 is read, the read sector pointer increments to point to the next syndrome region 604 storing the next set of syndromes SYN1 for sector 1. In this process, when the last syndrome region 610 (e.g., SYNN) is reached, the read sector pointer 614 wraps back to the first region 602 to implement the circular buffer arrangement.

On the other hand, the write sector pointer 616 sequentially keeps track of the next syndrome region to be written to. The write sector pointer 616 sequentially points to the next syndrome region by incrementing the pointer in response to the WRITE signal. For example, the write sector pointer 616 may point to syndrome region 606 when a WRITE signal is received to write syndrome set SYN2 for sector 2. In this case, the syndrome set SYN2 for sector 2 is written to the syndrome region 606. The write sector pointer is also incremented to point to the next syndrome region 608 so that the next write operation can write the syndrome set SYN3 to the region 608. Similar to the read sector pointer, when the last syndrome region 610 (e.g., SYNN) is reached, the read sector pointer 614 wraps back to the first region 602 to implement the circular buffer arrangement. In this circular buffer arrangement, the wrapping back from EA to the BA of the syndrome region during writing and reading of syndrome sets allows the previously accessed (i.e., read) syndrome sets to be replaced with new sets of syndromes. By thus allowing a new set of syndromes to overwrite the expired set of syndromes, the circular buffer 218 maximizes savings in space while minimizing the cost in implementing the buffer scheme.

Figure 7:
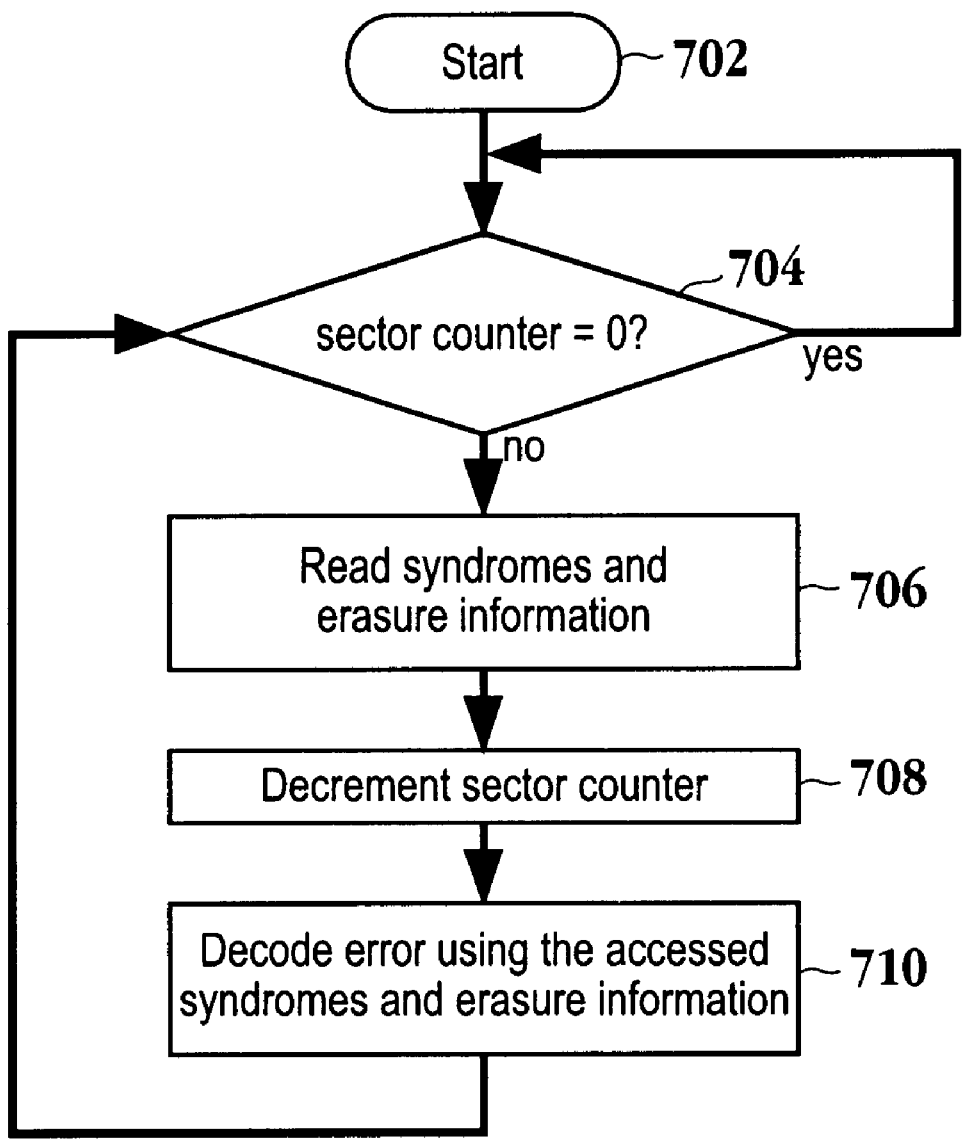
FIG. 7 illustrates a flowchart of an exemplary method for accessing the syndrome region to decode errors.

FIG. 7 illustrates a flowchart of an exemplary method for accessing the syndrome region 512 to decode errors in accordance with one embodiment of the present invention. The method begins in operation 702 and proceeds to operation 704, where it is determined if sector counter is equal to zero. If the sector counter is equal to 0, then the syndrome region is empty and the method proceeds back to operation 704 until sector counter becomes greater than zero. When the sector counter is greater than zero, the method proceeds to operation 706, where a set of syndromes and erasure information are read from the buffer. After the set of syndromes has been read, the sector counter is decremented by one in operation 708. In operation 710, the accessed set of syndromes and the erasure information are used to decode errors for the sector associated with the set of syndromes. Then, the method proceeds back to operation 704 to determine if a set of syndromes can be read for decoding errors in the next sector.

The present invention thus generates syndromes as the ECC data sectors are received and stores the generated syndromes in the buffer. The stored syndromes are then be fetched from the buffer for performing error correction. The buffer is updated with new a new set of syndromes for a new ECC data sector after the new sector has been received. By thus storing the generated syndromes for each of the sectors, the present invention effectively decouples decoding of errors from the one sector limitation without substantially affecting buffer performance.

While the present invention has been described in terms of several preferred embodiments, there are alterations, permutations, and equivalents which fall within the scope of this invention. It should also be noted that there are alternative ways of implementing both the method, device, and system of the present invention. It is therefore intended that the following appended claims be interpreted as including all such alterations, permutations, and equivalents as fall within the true spirit and scope of the present invention.

What is claimed is:

1. A method for detecting and correcting errors in error correction coded (ECC) data sectors, the ECC data sectors being sequentially received from a data storage medium, the method comprising the operations of:
   a) receiving a current ECC data sector, the current ECC data sector being an ECC data sector currently being received;
   b) while receiving the current ECC data sector, detecting errors in the current ECC data sector by generating a set of syndromes, the set of syndromes including non-zero syndromes indicating errors;
   c) storing the set of syndromes and erasure information for the current ECC data sector and the ECC data sector in a buffer upon receipt of the current ECC data sector;
   d) repeating the operations a) through c) for a next ECC data sector, wherein the current ECC data sector becomes a past sector and the next ECC data. sector becomes the current ECC data sector; and
   e) while repeating the operations a) through c) for the current sector, decoding the errors for the past ECC data sector by accessing the set of syndromes and the erasure information for the past ECC data sector without interrupting the receipt of the next ECC data sector, the accessing the set of syndromes and the erasure information further including:
      determining if a sector counter is equal to zero;
      if the sector counter is equal to zero, reading the set of syndromes and erasure information; and
      using the set of syndromes and the erasure information to decode the errors for the past ECC data sector.

2. The method as recited in claim 1, wherein the buffer is configured to store a plurality of sets of syndromes, each set of syndromes being associated with an ECC data sector, wherein the sets of syndromes are sequentially accessed for decoding the syndromes.

3. The method as recited in claim 1, wherein the data storage medium is a hard disk medium.

4. The method as recited in claim 1, wherein the data storage medium is an optical medium.

5. The method as recited in claim 1, wherein the operation e) further comprises the operation of:
   determining error locations and error patterns from the set of syndromes for the past ECC data sector.

6. The method as recited in claim 5, wherein the operation e) further comprises the operation of:
   correcting the detected errors in the past ECC data sector by using the determined error locations and error patterns.

7. The method as recited in claim 1, wherein the set of syndromes for the current ECC data sector is stored in a buffer so as to decouple syndrome generation from the operation of decoding the errors.

8. The method as recited in claim 7, wherein the buffer is a circular buffer that is configured to contain a predetermined number of sets of syndromes.

9. A device for detecting and correcting errors in error correction coded (ECC) data sectors, the ECC data sectors being sequentially received as a data stream from a data storage medium, the device comprising:
   a buffer for sequentially receiving and storing the ECC data sectors from the data storage medium;
   an error detection and correction (EDAC) circuitry arranged to sequentially receive the ECC data sectors for sequentially generating a plurality of syndrome sets for the ECC data sectors to detect errors in the ECC data sector, one syndrome set per ECC data sector, each syndrome set including a plurality of syndromes the plurality of syndromes including non-zero syndromes indicating errors, the EDAC circuitry sequentially storing the syndrome sets into the buffer while accessing the stored syndrome sets sequentially to decode errors in the associated ECC data sectors without interrupting the receipt of the next ECC data sector; and
   a sector counter configured to indicate whether the buffer contains syndromes, the sector counter configured to be decremented after a read operation and incremented after a write operation.

10. The device as recited in claim 9, wherein the device generates erasure information containing bad data byte locations, wherein the erasure information is stored along with each of the syndrome sets, and wherein the stored erasure information is accessed along with the associated syndrome set for decoding the errors in the associated ECC data sector.

11. The device as recited in claim 9, wherein the EDAC circuitry decodes the errors in the ECC data sectors by generating error locations and error patterns from the accessed syndrome sets.

12. The device as recited in claim 9, wherein the buffer is a circular buffer that is configured to contain a predetermined number of sets of syndromes.

13. The device as recited in claim 9, wherein the data storage medium is a hard disk medium.

14. The device as recited in claim 9, wherein the data storage medium is an optical medium.

15. The device as recited in claim 9, further comprising:
a buffer manager coupled between the EDAC circuitry and the buffer to sequentially transmit the generated syndrome sets for storage in the buffer, the buffer manager sequentially accessing and providing the stored syndrome sets in the buffer to the EDAC circuitry for decoding of the errors.

16. The device as recited in claim 15, further comprising:
a disk manager arranged to sequentially receive and provide the ECC data sectors to the buffer manager.

17. The device as recited in claim 16, wherein the disk manager is coupled to provide the ECC data sectors to the EDAC circuitry for generating the syndrome. sets.

18. The device as recited in claim 16, wherein the device generates erasure information containing bad data byte locations, wherein the erasure information is stored along with each of the syndrome sets, and wherein the stored erasure information is accessed along with the associated syndrome set for decoding the errors in the associated ECC data sector.

19. The device as recited in claim 9, wherein the EDAC circuitry further comprises:
a syndrome generator receiving the ECC data sectors and generating the syndrome sets from the received ECC data sectors, the syndrome generator transmitting the each of the syndrome sets to the buffer for storage; and
an ECC decoder arranged to receive the syndrome sets from the buffer for decoding errors in the ECC data sectors.

20. The device as recited in claim 19, wherein the ECC decoder determines error locations and error patterns for the ECC data sectors, wherein the device further comprises:
a correction circuitry coupled to receive the error locations and the error patterns from the ECC decoder, the correction circuitry being arranged to correct the errors in the ECC data sectors.

21. A method for detecting and correcting errors in error correction coded (ECC) data sectors, the ECC data sectors being sequentially received as a data stream from a data storage medium, the method comprising:
sequentially receiving and storing the ECC data sectors from the data storage medium;
while receiving the ECC data sectors, sequentially generating a plurality of syndrome sets for the ECC data sectors to detect errors in the ECC data sector, one syndrome set per ECC data sector, each syndrome set including a plurality of syndromes, the plurality of syndromes including non-zero syndromes indicating errors;
sequentially storing the syndrome sets; and
accessing the stored syndrome sets sequentially to decode errors in the associated ECC data sectors, without interrupting the receipt of the next ECC data sector, the accessing the set of syndromes and the erasure information further including:
determining if a sector counter is equal to zero;
if the sector counter is equal to zero, reading the set of syndromes and erasure information; and
using the set of syndromes and the erasure information to decode the errors for the past ECC data sector.

22. The method as recited in claim 21, wherein erasure information containing bad data byte locations is generated and stored along with each of the syndrome sets, and wherein the stored erasure information is accessed along with the associated syndrome set for decoding the errors in the associated ECC data sector.

23. The method as recited in claim 21, wherein the operation of accessing the stored syndrome sets further comprises the operations of:
decoding the errors in the associated ECC data sectors;
correcting the errors in the associated ECC data sectors.

24. The method as recited in claim 23, wherein the errors are decoded by determining error locations and error patterns.

25. The method as recited in claim 21, wherein the data storage medium is a hard disk medium.

26. The method as recited in claims 21, wherein the data storage medium is an optical disk medium.

27. The method as recited in claim 23, wherein the syndrome sets are stored in a buffer so as to decouple syndrome generation from the operation of decoding the errors.

28. The method as recited in claim 27, wherein the buffer is configured to store the syndrome sets, wherein the syndrome sets are sequentially accessed for decoding the syndromes.

29. The method as recited in claim 27, wherein the buffer is a circular buffer that is configured to contain a predetermined number of sets of syndromes.

* * * * *